United States Patent
Peters et al.

(10) Patent No.: US 9,839,970 B2
(45) Date of Patent: Dec. 12, 2017

(54) DUAL WIRE WELDING SYSTEM AND METHOD

(75) Inventors: Steven Peters, Huntsburg, OH (US); Dennis Hartman, North Ridgeville, OH (US)

(73) Assignee: LINCOLN GLOBAL, INC., City of Industry, CA (US)

(*) Notice: Subject to any disclaimer, the term of this patent is extended or adjusted under 35 U.S.C. 154(b) by 1151 days.

(21) Appl. No.: 12/975,234

(22) Filed: Dec. 21, 2010

(65) Prior Publication Data
US 2012/0152921 A1 Jun. 21, 2012

(51) Int. Cl.
  B23K 9/10 (2006.01)
  B23K 31/02 (2006.01)
  B23K 9/173 (2006.01)
  B23K 9/12 (2006.01)

(52) U.S. Cl.
  CPC ............ *B23K 9/1735* (2013.01); *B23K 9/121* (2013.01); *B23K 9/123* (2013.01)

(58) Field of Classification Search
  CPC ................... B23K 9/00; B23K 9/0008–9/0052
  USPC ............ 219/137.31, 137.42, 137.44, 137.51, 219/137.61, 139, 130.1, 137 R, 137.2, 74, 219/75, 137 PS, 62, 136, 125.11, 125.12, 219/130, 131, 127; 148/9.5; 901/42
  See application file for complete search history.

(56) References Cited

U.S. PATENT DOCUMENTS

| | | | |
|---|---|---|---|
| 1,368,287 A * | 2/1921 | Pennington et al. | 428/387 |
| 1,605,860 A * | 11/1926 | Snelling | 219/162 |
| 2,594,333 A * | 4/1952 | Medicus | 219/75 |
| 2,756,311 A * | 7/1956 | Persson et al. | 219/74 |
| 2,849,593 A * | 8/1958 | Volff et al. | 219/145.32 |
| 2,866,079 A | 12/1958 | Morley et al. | |
| 2,911,517 A * | 11/1959 | Armstrong | 219/137.7 |
| 2,957,101 A * | 10/1960 | Barkley | 314/129 |
| 3,131,325 A * | 4/1964 | Briggs | 314/74 |
| 3,274,371 A * | 9/1966 | Saenger, Jr. et al. | 219/137 R |
| 3,328,556 A * | 6/1967 | Nelson et al. | 219/137 R |
| 3,384,778 A * | 5/1968 | Jeannette | 314/68 |
| 3,693,858 A * | 9/1972 | Araya et al. | 226/108 |
| 3,694,620 A * | 9/1972 | Gleason | 219/137.7 |
| 3,746,833 A * | 7/1973 | Ujiie | 219/137 R |
| 3,933,533 A * | 1/1976 | Uchida et al. | 219/69.1 |
| 4,012,621 A * | 3/1977 | Uchida et al. | 219/145.22 |
| 4,182,947 A * | 1/1980 | Brower | 219/70 |
| 4,295,746 A * | 10/1981 | Hartmann | 347/159 |
| 4,336,441 A * | 6/1982 | Godai et al. | 219/137 WM |
| 4,437,906 A | 3/1984 | Tateishi et al. | |

(Continued)

FOREIGN PATENT DOCUMENTS

DE  2108614 A1  10/1971
DE  19611583 A1  9/1997

(Continued)

OTHER PUBLICATIONS

"Tandem Wire MIG Welding"; Wolf Robotics; Aug. 29, 2007.

*Primary Examiner* — David Angwin
*Assistant Examiner* — Gyounghyun Bae
(74) *Attorney, Agent, or Firm* — Perkins Coie LLP

(57) ABSTRACT

A system and method of welding is provided where at least two welding electrodes are provided to and passed through a single orifice on a single contact tip and a welding waveform is provided to the electrodes through the contact tip to weld simultaneously with both electrodes.

9 Claims, 4 Drawing Sheets

(56) References Cited

U.S. PATENT DOCUMENTS

| | | | | |
|---|---|---|---|---|
| 4,475,996 A * | 10/1984 | Inoue | | 205/670 |
| 4,541,616 A * | 9/1985 | Dean | | 266/48 |
| 4,697,791 A * | 10/1987 | Henderson et al. | | 266/48 |
| 4,743,731 A * | 5/1988 | Seuring et al. | | 219/69.1 |
| 4,902,873 A * | 2/1990 | Ivannikov | | B23K 35/0283 |
| | | | | 219/137 R |
| 4,968,867 A * | 11/1990 | Banzai et al. | | 219/69.12 |
| 5,324,552 A | 6/1994 | Opower et al. | | |
| 5,491,321 A * | 2/1996 | Stuart et al. | | 219/137.61 |
| 5,635,091 A * | 6/1997 | Hori et al. | | 219/137.61 |
| 5,714,735 A * | 2/1998 | Offer | | 219/136 |
| 5,958,261 A * | 9/1999 | Offer et al. | | 219/75 |
| 5,977,504 A * | 11/1999 | Offer et al. | | 219/75 |
| 5,981,906 A | 11/1999 | Parker | | |
| 6,172,333 B1 * | 1/2001 | Stava | | 219/137 PS |
| 6,225,589 B1 * | 5/2001 | Bartok | | 219/69.15 |
| 6,627,839 B1 * | 9/2003 | Luckowski et al. | | 219/76.14 |
| 6,683,279 B1 * | 1/2004 | Moerke | | 219/137.2 |
| 6,737,616 B1 * | 5/2004 | Sherrill | | 219/536 |
| 7,183,516 B2 * | 2/2007 | Blankenship et al. | | 219/130.31 |
| 7,429,716 B2 | 9/2008 | Bong et al. | | |
| 7,495,192 B2 | 2/2009 | Takahashi et al. | | |
| 7,525,067 B2 | 4/2009 | Diez et al. | | |
| 7,777,447 B2 * | 8/2010 | Vogel | | 320/107 |
| 2006/0070985 A1 | 4/2006 | Nakabayashi et al. | | |
| 2007/0145028 A1 * | 6/2007 | Artelsmair | | 219/137.71 |
| 2007/0164074 A1 * | 7/2007 | Schorghuber et al. | | 226/108 |
| 2008/0190900 A1 * | 8/2008 | Zhang et al. | | 219/121.45 |
| 2009/0050609 A1 | 2/2009 | Berger et al. | | |
| 2010/0213179 A1 * | 8/2010 | Peters | | 219/121.64 |
| 2010/0301030 A1 * | 12/2010 | Zhang et al. | | 219/130.1 |

FOREIGN PATENT DOCUMENTS

| | | |
|---|---|---|
| DE | 19611597 A1 | 9/1997 |
| GB | 990208 A | 4/1965 |
| GB | 1502288 A | 3/1978 |
| GB | 2058637 A | 4/1981 |
| JP | 2008055506 A | 3/2008 |
| JP | 2008087045 A | 4/2008 |
| JP | 2010069494 A | 4/2010 |
| JP | 2010082624 A | 4/2010 |
| SU | 1237347 A1 | 6/1986 |

* cited by examiner

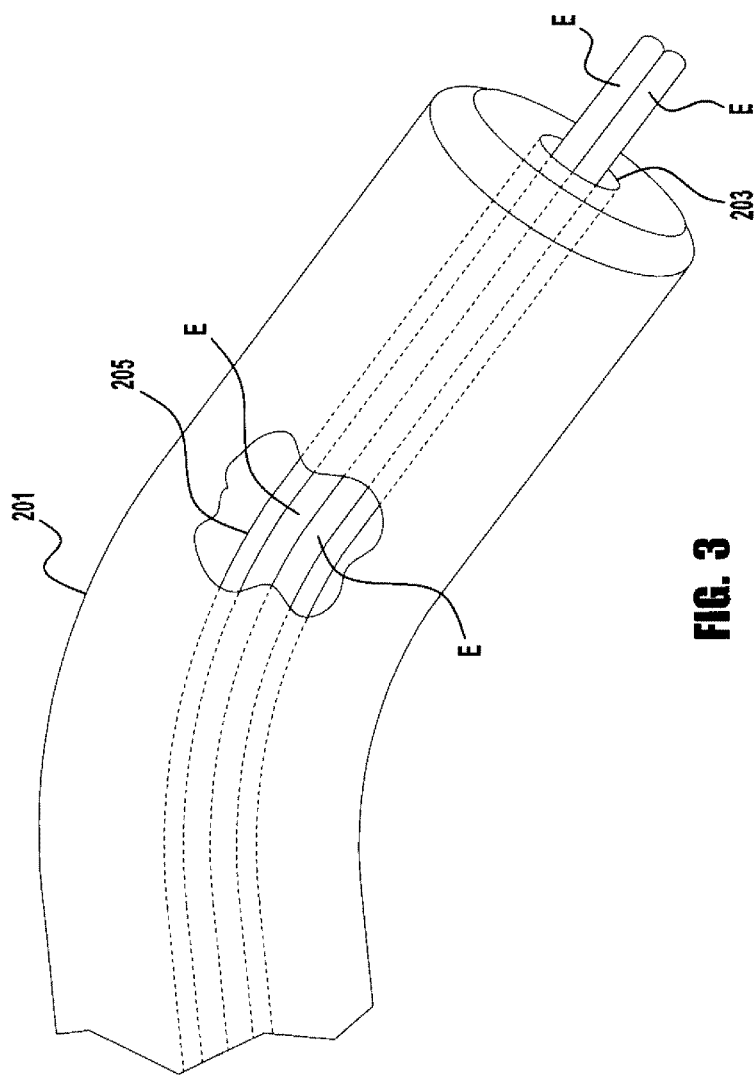

DUAL WIRE WELDING SYSTEM AND METHOD

BACKGROUND OF THE INVENTION

Field of the Invention

Devices, systems, and methods consistent with the invention relate to welding with a dual wire configuration using a single contact tip.

Description of the Related Art

When welding, it is often desirable to increase the width of the weld bead or increase the length of the weld puddle during welding. There can be many different reasons for this desire, which are well known in the welding industry. For example, it may be desirable to elongate the weld puddle to keep the weld and filler metals molten for a longer period of time so as to reduce porosity. That is, if the weld puddle is molten for a longer period of time there is more time for harmful gases to escape the weld bead before the bead solidifies. Further, it may desirable to increase the width of a weld bead so as to cover wider weld gap or to increase a wire deposition rate. In both cases, it is common to use an increased electrode diameter. The increased diameter will result in both an elongated and widen weld puddle, even though it may be only desired to increase the width or the length of the weld puddle, but not both. However, this is not without its disadvantages. Specifically, because a larger electrode is employed more energy is needed in the welding arc to facilitate proper welding. This increase in energy causes an increase in heat input into the weld and will result in the use of more energy in the welding operation, because of the larger diameter of the electrode used.

BRIEF SUMMARY OF THE INVENTION

An exemplary embodiment of the present invention is a welding system and method for welding where a welding power supply provides a welding waveform to a contact tip having an exit orifice. A wire feeding mechanism provides at least two welding electrodes having a circular cross-section to a channel in the contact tip, where each of the electrodes passes through the channel in a longitudinal orientation and exits the contact tip through the same exit orifice. The welding waveform is provided to each of the electrodes by the contact tip for a welding operation.

BRIEF DESCRIPTION OF THE DRAWINGS

The above and/or other aspects of the invention will be more apparent by describing in detail exemplary embodiments of the invention with reference to the accompanying drawings, in which:

FIG. 3 illustrates a diagrammatical representation of a further exemplary embodiment of the present invention;

DETAILED DESCRIPTION OF EXEMPLARY EMBODIMENTS

Figure 1:
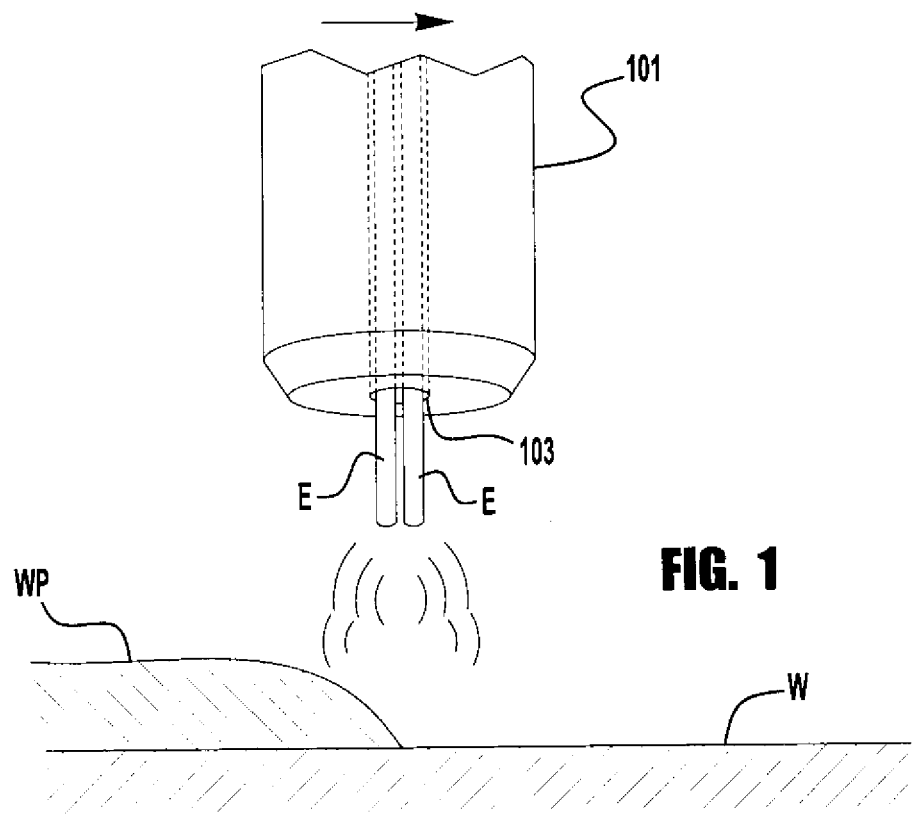
FIG. 1 illustrates a diagrammatical representation of an exemplary embodiment of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 is a representative diagrammatical representation of an exemplary embodiment of the present invention. Specifically, a contact tip 101 is shown having two welding electrodes E passing through the same orifice 103 in the tip 101. Typically, in welding with a contact tip 101 a single electrode E is passed through the orifice 103. However, in the present invention at least two electrodes E are passed through the same orifice 103 in a single tip 101.

Figure 2:
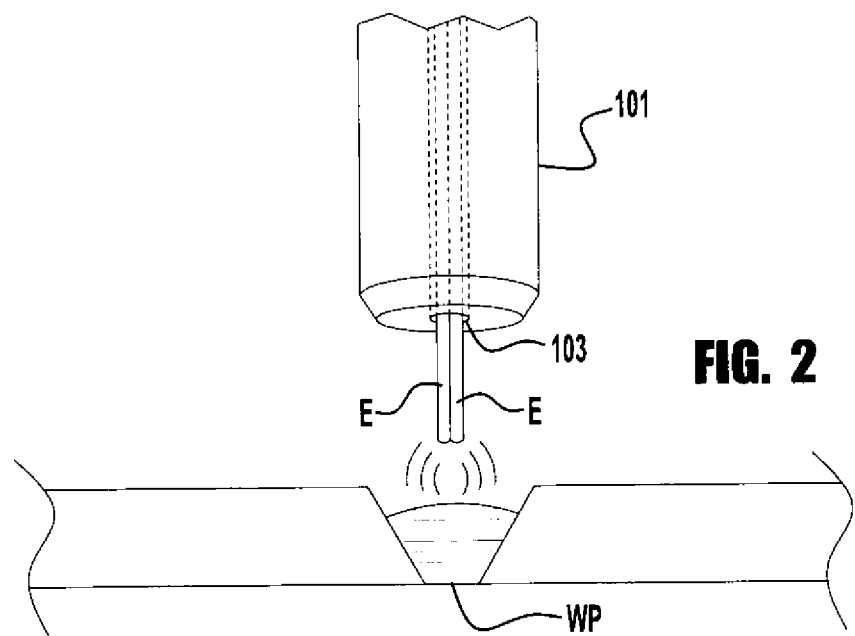
FIG. 2 illustrates a diagrammatical representation of another exemplary embodiment of the present invention.

In FIG. 1, the electrodes E are shown in a tandem configuration. That is, the electrodes E are positioned in the orifice 103 in a front-to-back configuration related to the direction of travel of the contact tip 101 during welding. This tandem electrode configuration provides an elongated weld puddle WP, but does not increase the width of the weld puddle. FIG. 2 similarly shows an exemplary embodiment of the present invention in which the electrodes E are shown in a side-by-side configuration coming out of the same orifice 103 of the same contact tip 101. In using a side-by-side configuration a wider weld puddle WP can be produced when desired.

By employing embodiments of the present invention, an increase weld puddle width or length is achieved without the undesired increase in heat input associated with employing a larger diameter single electrode, as is traditionally done. For example, it may be desirable to have a weld puddle WP width which is consistent with the use of an electrode having a width of 0.0625 inch. Traditionally, a single electrode having a 0.0625 inch diameter would be employed, requiring the energy input necessary to properly weld with an electrode of this size. However, in an exemplary embodiment of the present invention, two electrodes E having a diameter of 0.030 inch each can be employed in a side-by-side configuration to achieve the same weld puddle width. However, rather than requiring the energy input needed to weld with a 0.0625 inch diameter wire, this embodiment of the present invention will only require the energy input necessary for welding with a 0.045 inch diameter wire. This is because, although the width of the weld puddle achieved is similar to that of a 0.0625 inch diameter electrode, the overall cross-sectional area of the combined 0.030 inch diameter electrodes is similar to that of a single 0.045 inch diameter electrode. Thus, only the energy needed to weld with a 0.045 inch diameter electrode need be utilized while a width consistent with a 0.0625 inch diameter electrode is achieved. Similarly, in the example discussed above a welding waveform designed for only a 0.045 inch diameter electrode can be utilized. It is not necessary to employ a welding waveform for a 0.0625 inch diameter electrode.

Furthermore, in an exemplary embodiment of the present invention, a standard sized contact tip can be utilized. For example, in the above discussed example, a standard 0.052 inch diameter orifice contact tip 101 can be utilized. Typically, the actual orifice diameter of a standard 0.052 inch diameter orifice contact tip is about 0.060 inches. Because of this, two 0.030 inch diameter electrodes E can be passed through the single orifice 103 easily. Of course, the present invention is not limited to the example set forth above, which is merely intended to be exemplary to aid in the understanding of the present invention.

In various embodiments of the contact tip 101 the orifice 103 has a diameter sufficient to transfer the welding waveform into each of the electrodes E.

Further, in exemplary embodiments of the present invention the contact tip 101 utilized can be a straight bore type tip. However, in further exemplary embodiments of the present invention, the contact tip can be of a gooseneck type. This is depicted in FIG. 3, in which the contact tip 201 is bent at an angle. In this embodiment the electrode channel 205 is also bent as shown in FIG. 3. In exemplary embodiments of the present invention, the channel 205 is configured to orient the electrodes E relative to each other, as desired. For example, in the embodiment shown the downward angling of the channel 205 in the tip 201 causes the electrodes E to align in a side-by-side orientation when the electrodes E exit the orifice 203. Thus, it is contemplated that the angling and/or cross-section of the channel 205 in the tip 201 can be configured to orient the electrodes E as desired for a particular welding operation.

In another exemplary embodiment, rather than the tip being bent, a standard "gooseneck" type welding gun can be used. In such welding guns, the gun itself has some bent portions through which the electrode travels prior to engaging with the tip, in which the tip can be a standard straight contact tip. In exemplary embodiments of the present invention, such a welding gun is employed such that the electrodes E align themselves appropriately within the bends of the welding gun. In fact, it has been discovered that standard "gooseneck" type welding guns can be used with embodiments of the present invention, such that as the electrodes E pass through the welding gun the electrodes E become aligned in a side-by-side configuration and exit the tip in a side-by-side configuration. Thus, for example, the image of the tip 201 shown in FIG. 3 could be a welding gun tube to which a tip is coupled, rather than a bent torch tip (this is diagrammatically depicted in FIG. 5 discussed below). In fact, in various exemplary embodiments of the present invention, the bend in the torch tube or the torch tip 201 can be as high as 60 degrees. Because the structure and construction of welding guns having a bend are well known in the welding industry they will not be described in detail herein.

Within the channel 205 the electrodes E are positioned adjacent to each other, such that the electrodes are longitudinal to each other throughout the length of the channel 205. The electrodes E may change positioning in the channel E as the electrodes E pass through the channel 205 (that is they may move from side-to-side to on top of each other), but the electrodes E remain longitudinal to each other throughout the length of the channel 205. That is, the electrodes E do not intertwine or twist with each other.

It is known that some electrodes E are manufacturing having a cast. It is also known, in single electrode operations, that the shape/curvature of the channel 205 (such as in a gooseneck shaped contact tip 101) can orient the cast in the electrode E with the channel 205. Similarly, embodiments of the present invention employ the shape of the channel 205 to aid in orienting the electrode E in conjunction with the cast of the electrode E.

Figure 4A:
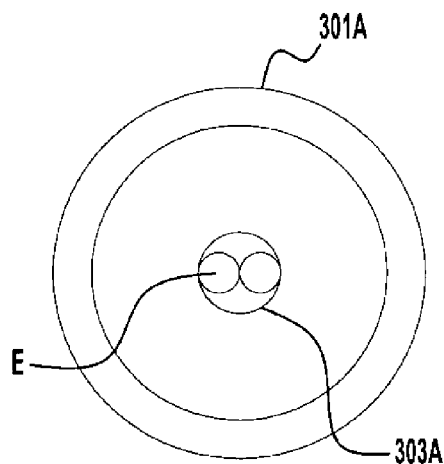
FIGS. 4A to 4C illustrate diagrammatical representations of various exemplary embodiments of the present invention.
Figure 4B:
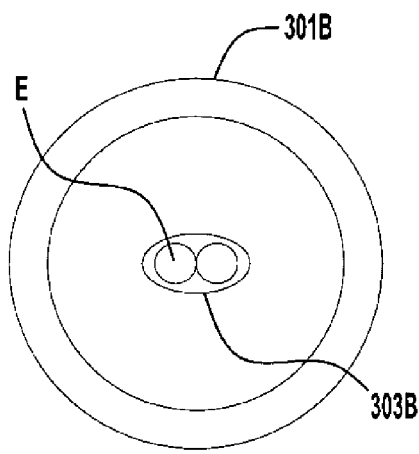
Figure 4C:
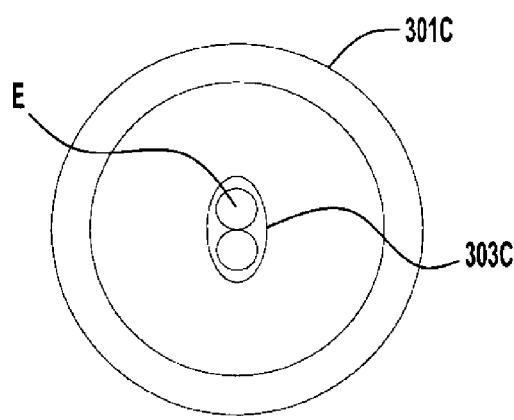

FIGS. 4A-4C depict various orifice configurations for exemplary embodiments of the present invention. As shown in FIG. 4A a circular orifice 303A is employed in the contact tip 301A. The tip 301A can be of a straight or gooseneck type tip. Further, in this embodiment the tip channel (not shown) internal to the tip 301A can have a constant cross-section with the orifice 303A. However, in further exemplary embodiments, the channel can have a cross-section which is different from the orifice 303A so as to orient the electrodes E within the channel before the electrodes E exit the orifice 303A. In a further exemplary embodiment, as shown in FIG. 4B the orifice 303B has a horizontally oriented orifice with an elliptical shape to orient the electrodes in a side-by-side orientation. Similarly, in FIG. 4C the orifice 303C has an elliptical shape which is oriented vertically so that the electrodes E are oriented in a front-to-back orientation.

As with the embodiment in FIG. 4A, in the embodiments shown in FIGS. 4B and 4C, some exemplary embodiments the channel (not shown) in the tip 301B/C has the same cross-section as the orifice 303B/C, while in other embodiments the cross-section of the channel can vary from the orifice 303B/C. For example, it is contemplated while the orifice 303B/C has an elliptical shape; the channel has a circular cross-section. Thus, the shaping of the orifice and/or the tip channel can be configured to orient the electrodes as desired during a welding operation. Additionally, it is noted that the present invention is not limited to either a circular or elliptical shape orifice 303A/B/C as shown in FIGS. 4A-C, but other shapes, such as oval may be used. The present invention is not limited in this regard so long as the desired electrode orientation is achieved during welding.

Further, in exemplary embodiments of the present invention, the contact tip 301B/C is of a design that can be rotated so as to be oriented in at least two positions within a welding gun or welding torch, such that the same contact tip 301B/C can be used to orient the electrodes E in a side-by-side or tandem configuration. In this embodiment, it is not necessary to use two different contact tips for two different welding operations, but rather the change in the orientation of the tip in the torch or gun. Thus, for example, during a welding operation if a turn is to be made it is not necessary to change to the tip or the orientation of the welding torch, just the tip.

In an exemplary embodiment of the present invention a drive mechanism is employed to orient the tip 301B/C within the welding gun. In such an embodiment, the drive mechanism, such as a motor or other means, can turn the tip 301N/C as desired to achieve the desired orientation. This can be controlled by an operator or via a computer system, such as in robotic welding operations. Thus, during welding an operator can control manually or automatically the orientation of the tip 301B/C to achieve the desired weld puddle during welding. This control can be achieved remotely, such as at the control center of a welding station or can be controlled at the welding torch. The present invention is not limited in this regard.

Figure 5:
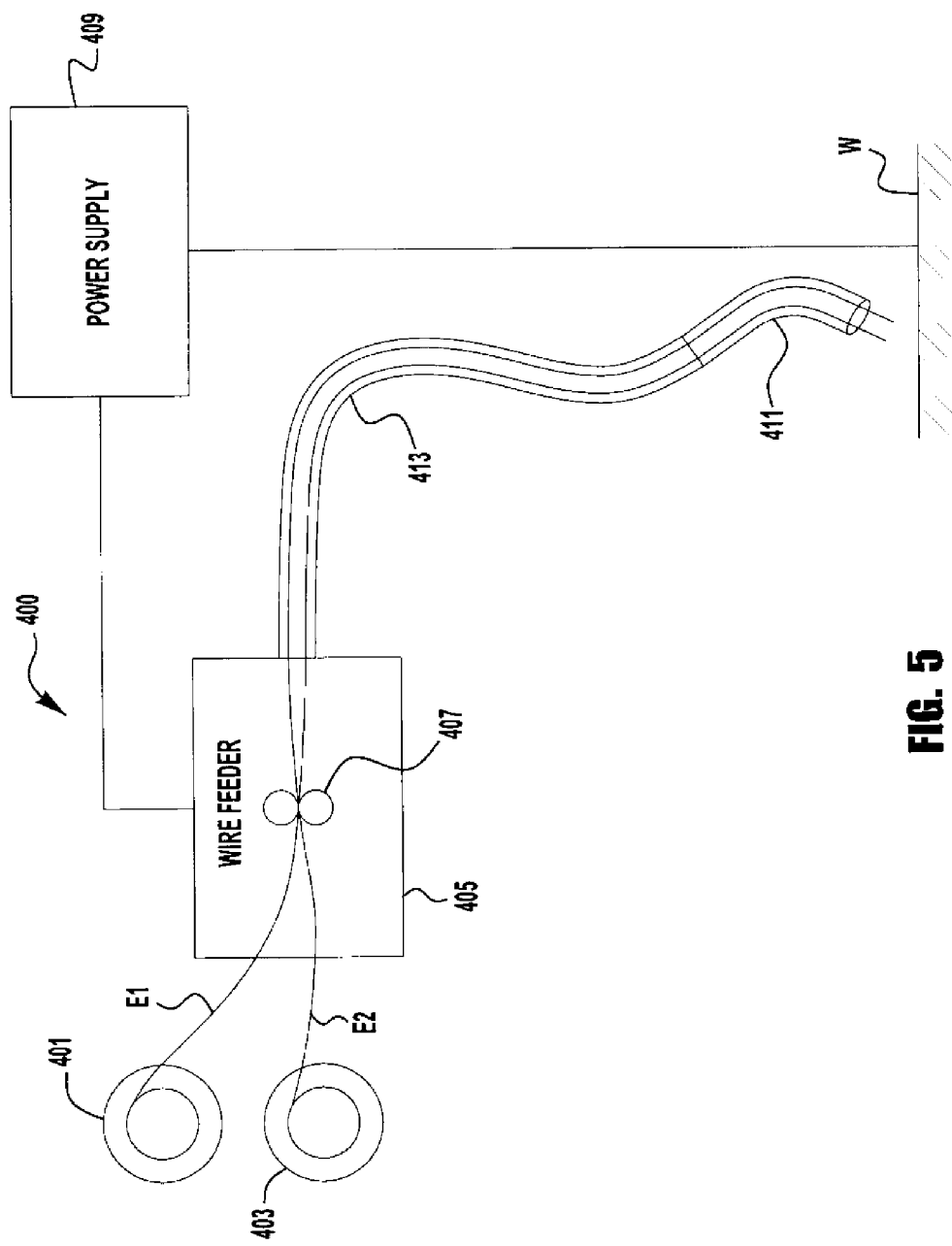
FIG. 5 illustrates a diagrammatical representation of an exemplary embodiment of a welding system of the present invention.

Turning now to FIG. 5 an exemplary embodiment of a welding system 400 in accordance with an exemplary embodiment of the present invention is depicted. The welding system 400 contains a welding power source 409 which is coupled to both a welding torch 411 (having a contact tip—not shown) and a wire feeder 405. The torch 411 can be coupled to any known or used welding gun or torch and can be of a straight or gooseneck type as described above. The wire feeder 405 draws the electrodes E1 and E2 from electrode sources 401 and 403, respectively, which can be of any known type, such as reels, spools, containers or the like. The wire feeder 405 is of a known construction and employs feed rolls 407 to draw the electrodes E1 and E2 and push the electrodes to the torch 411. In an exemplary embodiment of the present invention, the feed rolls 407 and wire feeder 405 are configured for a single electrode operation. It has been discovered that embodiments of the present invention, using a dual wire configuration, can be utilized with a wire feeder 405 and rollers 407 only designed for a single wire feeding operation. For example, rollers 407 can be configured for a single 0.045 inch diameter electrode, but will suitable drive two electrodes of a 0.030 inch diameter without modification to the wire feeder 405 or the rollers 407.

Once driven by the rollers 407, the electrodes E1 and E2 are passed through a liner 413 to deliver the electrodes E1 and E2 to the torch 411. The liner 413 is appropriately sized to allow for the passage of the electrodes E1 and E2 to the torch 411. For example, for two 0.030 inch diameter electrodes, a standard 0.0625 inch diameter liner 413 (which is typically used for a single 0.0625 inch diameter electrode) can be used with no modification.

Although the examples referenced above discuss the use of two electrodes having a same diameter, the present invention is not limited in this regard as embodiments can use electrodes of a different diameter. That is, embodiments of the present invention can use an electrode of a first, larger, diameter and an electrode of a second, smaller, diameter. In such an embodiment, it is possible to more conveniently weld two work pieces of different thicknesses. For example, the larger electrode can be oriented to the larger work piece while the smaller electrode can be oriented to the smaller work piece. Further, embodiments of the present invention can be used for many different types of welding operations including, but not limited to, metal inert gas, submerged arc, and flux-cored welding. Further, embodiments of the present invention can be used for automatic, robotic and semi-automatic welding operations. Additionally, embodiments of the present invention can be utilized with different electrode types. For example, it is contemplated that a cored electrode can be coupled with a non-cored electrode. Thus, embodiments of the present invention can be utilized a broad spectrum of welding operations.

A method of employing an exemplary embodiment of the present invention will now be discussed. Based on a welding operation to be performed electrodes E1 and E2 are selected and an electrode orientation for the welding operation is determined. If it is desired that a longer welding puddle is needed to eliminate porosity, for example for welding galvanized steel, then the appropriate welding torch 411 and contact tip is selected. Alternatively, if it is desired that side-by-side welding is needed, for example for welding sheet metal, then the torch 411 and/or a tip is selected appropriately.

During operation, the wire feeder 405 provides the electrodes E1 and E2 to the torch 411. The power supply 409 provides the desired welding waveform to the torch 411 for the welding operation. Embodiments of the present invention can be utilized with many different types of welding waveforms. For example, embodiments of the present invention can be utilized with pulse welding, short arc welding, surface tension transfer welding, as well as many other types of welding waveform profiles.

During welding, a standard stick-out distance can be utilized. For example, a stick-out of ¾ to 1 inch can be used. As discussed above, the power supply supplies a welding waveform suitable for welding the collective cross-sectional area of the electrodes E1 and E2. For example, if welding with two 0.030 inch diameter electrodes E1 and E2 a welding waveform having sufficient energy or welding current for welding with a single 0.045 inch diameter electrode can be utilized to provide a suitable weld. It is noted that although the cross-sectional area of two 0.030 inch diameter electrodes is not mathematically identical to that of a single 0.045 inch diameter electrode, for purposes of the present invention the relative cross-sectional areas are substantially the same. Surprisingly, it has been discovered that the use of a welding waveform designed for a single 0.045 inch diameter electrode (for example) can be utilized with two 0.030 inch diameter electrodes, requiring no change to the waveform (such as current, etc.) and results in a stable welding operation with the benefits stated above. This avoids the drawbacks of increased heat input that would result from welding with an electrode having a total cross-section larger than needed. That is, the present invention allows for a weld puddle/bead to be increased in size (for example having a width of 0.060 inches) while the total heat input into the weld is that which would normally come from the use of a smaller electrode (for example and electrode having a diameter of 0.045 inches). Of course, the present invention is not limited to the above electrode size examples, which are merely provided as examples to demonstrate the benefits and versatility of the present invention.

This reduction in overall heat input is highly advantageous in many respects. For example, with exemplary embodiments of the present invention it is possible to deposit more filler material (from the electrodes) for a given welding amperage, or to deposit the same amount of filler material with an overall less heat input.

Further, it has been discovered that other advantages can be attained from embodiments of the present invention. Specifically, it has been discovered that during short arc welding an increased range of operable wire feed speed can be obtained because of the increased arc stability provided with welding in accordance with embodiments of the present invention. For example, it has been unexpectedly discovered that two 0.030 inch diameter electrodes can be utilized at a higher wire feed speed, in a stable manner, than a single 0.045 inch diameter electrode, even though the overall cross-sectional area of the two 0.030 inch diameter electrodes is similar to that of a single 0.045 inch diameter electrode, the use of two 0.030 inch diameter electrodes provides a more stable welding. It is believed that this is due to the increase in overall exposed surface area of the two 0.030 inch diameter electrodes for a given stick-out distance over a single 0.045 inch diameter electrode. Because of this increased electrode surface area the arc pinch force is optimized, resulting in a more stable welding arc at higher wire feed speeds.

Therefore, various embodiments of the present invention can not only reduce the overall heat input into a weld while increasing the weld puddle length or width, but can also provide a more stable welding arc at higher wire feed speeds.

Further, although the exemplary embodiments have been discussed above utilizing two electrodes passing through the same orifice, other embodiments of the present invention can utilize more than two electrodes. For example it is contemplated that a three electrode configuration can be utilized consistent with the descriptions and discussions set forth above.

It is noted that the present invention is not limited by the type of welding wire to be utilized or the type of welding operation, but can be used in many different types of welding operations with many different types of welding electrodes and electrode combinations.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. An arc welding system, comprising:
   a welding gun including a contact tip having a channel and an exit orifice;
   an arc welding power supply which provides an arc welding waveform to at least two arc welding consumable electrodes having a circular cross-section via said contact tip; and
   a wire feeding mechanism which provides said at least two arc welding consumable electrodes from respective electrode sources to said channel in said contact tip, where said arc welding electrodes pass through said channel in a longitudinal orientation without intertwining or twisting with each other and exit said contact tip through said exit orifice.

2. The welding system of claim 1, wherein said channel is angled.

3. The welding system of claim 1, wherein said orifice has either an elliptical or oval shape.

4. The welding system of claim 1, wherein said channel has a cross-sectional shape at at least one point along its length which is different from the cross-sectional shape of said orifice.

5. The welding system of claim 1, wherein said channel has a circular cross-section at at least one point along its length.

6. The welding system of claim 1, wherein said contact tip is rotatable so as to change the orientation of said at least two electrodes relative to a weld bead.

7. The welding system of claim 1, wherein said at least two electrodes have a different diameter from each other.

8. The welding system of claim 1, wherein said at least two electrodes have a different composition.

9. The welding system of claim 1, wherein said welding waveform provides a welding current sufficient to weld with a single electrode having a cross-sectional area substantially the same as the total cross-sectional area of said at least two electrodes.

* * * * *